United States Patent [19]
Graser

[11] 3,949,870
[45] Apr. 13, 1976

[54] REUSABLE WRAP-BASKET CARRIER

[75] Inventor: Earl J. Graser, Monroe, La.

[73] Assignee: Olinkraft, Inc., West Monroe, La.

[22] Filed: July 17, 1974

[21] Appl. No.: 489,311

[52] U.S. Cl............... 206/141; 229/40; 229/51 TS
[51] Int. Cl.² .................................... B65D 75/08
[58] Field of Search ............... 206/170, 174–178, 206/180, 193, 194, 196, 197, 200, 434, 150, 162, 141; 229/40, 28 BC, 52 BC, 51 TS

[56] References Cited
UNITED STATES PATENTS

| | | | |
|---|---|---|---|
| 2,832,504 | 4/1958 | Foster | 206/141 |
| 2,838,223 | 6/1958 | Graf | 229/52 BC |
| 2,997,169 | 8/1961 | Poupitch | 206/150 |
| 3,086,651 | 4/1963 | Poupitch | 206/150 |
| 3,181,727 | 5/1965 | Graser et al. | 229/40 X |
| 3,278,075 | 10/1966 | Weiss | 206/197 X |
| 3,348,671 | 10/1967 | Wood | 206/194 X |
| 3,348,672 | 10/1967 | Brown | 229/40 X |
| 3,504,790 | 4/1970 | Owen | 206/162 |

*Primary Examiner*—Stephen P. Garbe
*Attorney, Agent, or Firm*—O'Brien & Marks

[57] ABSTRACT

A wrap around carrier, such as a six-pack carrier, has a top with a plurality of openings exposing objects in the carrier. Strips extending between each of the openings for retaining the objects in the carrier are formed with tear cuts partially therethrough or flaps to allow easy removal of each object and to allow the objects to be returned to the carrier.

12 Claims, 11 Drawing Figures

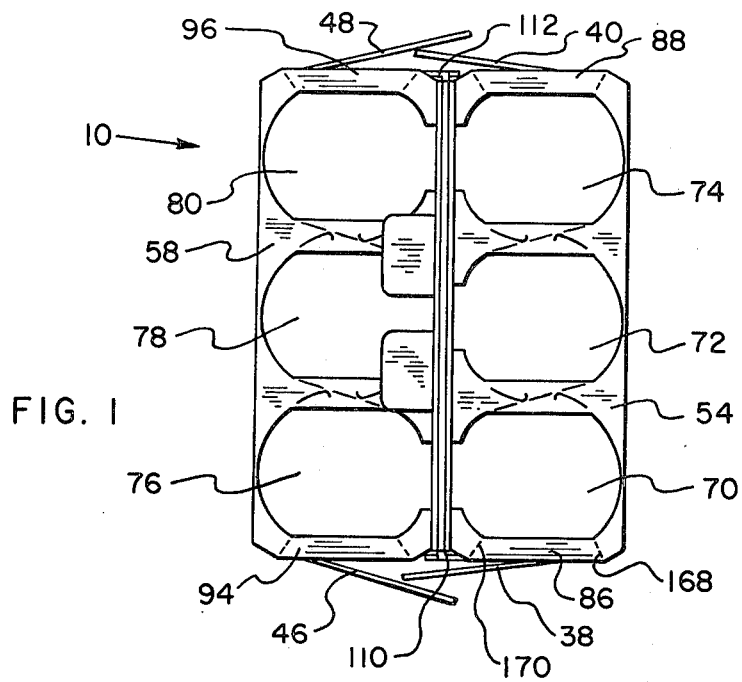
FIG. 1
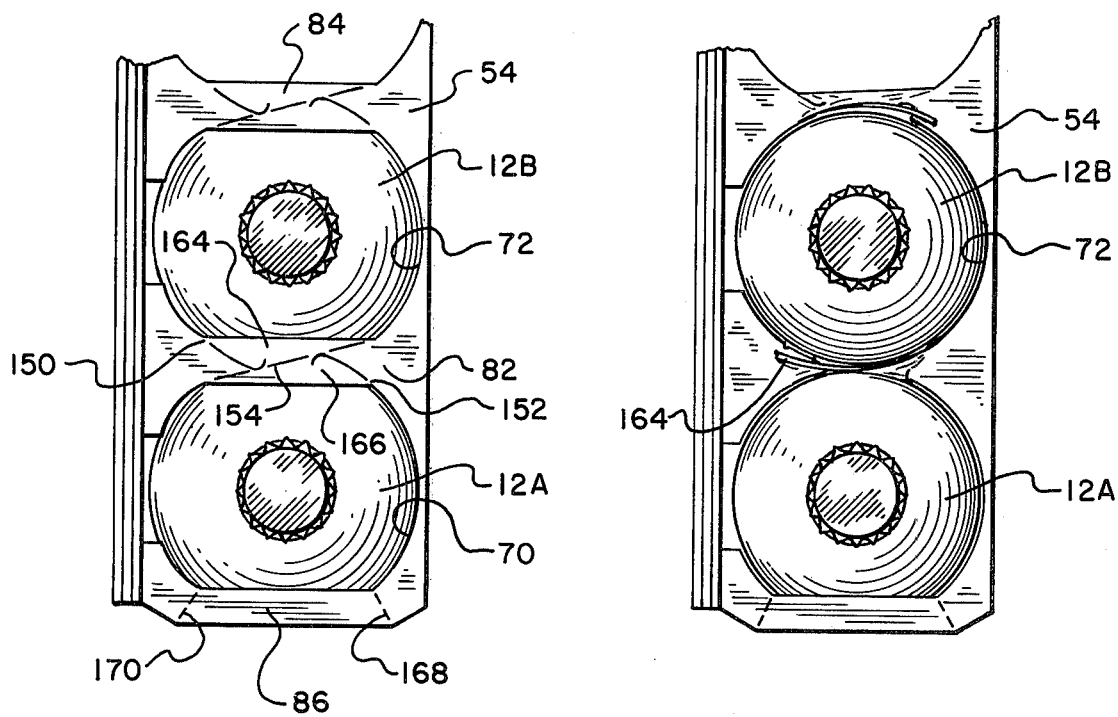
FIG. 5
FIG. 6

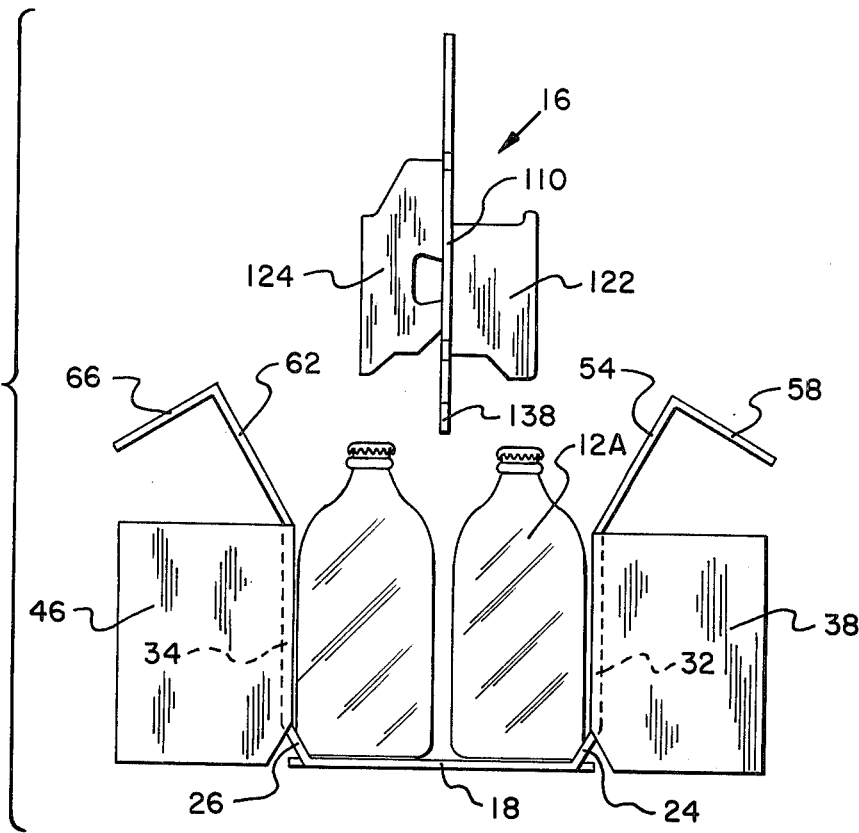
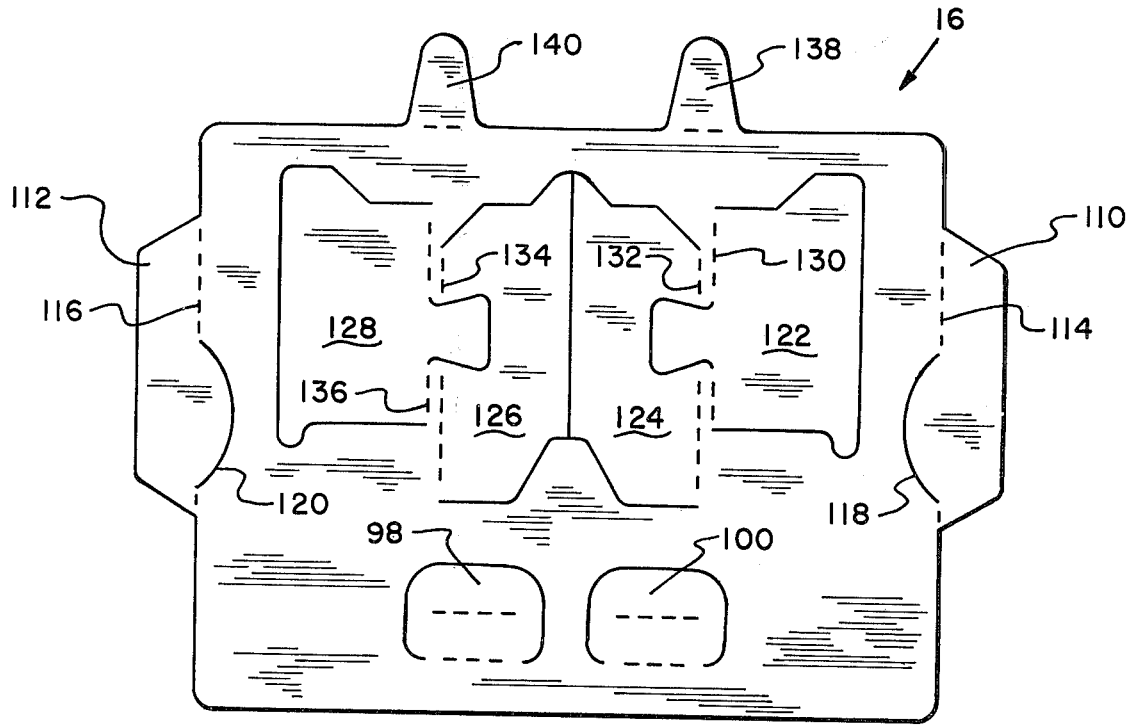
FIG. 4
FIG. 3

3,949,870

REUSABLE WRAP-BASKET CARRIER

BACKGROUND OF THE INVENTION

1. Field of the Invention

The invention relates to carriers for objects such as bottles, and in particular, to carriers which retain the objects therein even when tipped or inverted.

2. Description of the Prior Art

Basket type carriers as illustrated in U.S. Pat. No. 3,208,632 have a box-like structure with an open top and a handle extending thereacross. When used for carrying bottles, the basket carriers have individual compartments formed by a plurality of dividers or partitions separating the bottles. The basket carriers have the disadvantage that they must be maintained in an upright position or else the bottles will fall out the open tops of the carriers. Wrap-around carriers, such as illustrated in U.S. Pat. No. 3,181,727, generally use a one piece blank which is wrapped around a plurality of objects and then fastened together at the top or bottom to hold the bottles together; this type carrier is commonly known as a six-pack carrier. Wrap around carriers are more economical than basket carriers because bottles can be packaged in the wrap-around carriers up machines at a faster rate than the basket carriers can be assembled and bottles placed therein, and because the wrap around carriers utilize less paper board then the standard basket carriers. The wrap around carriers generally have the disadvantage that the carrier is ripped apart or otherwise destroyed when the objects are removed, thus preventing customer mixing of different beverages in the same six-pack or reuse of the carrier for storage or return of empty bottles.

As illustrated in U.S. Pat. Nos. 2,997,169, 3,348,672 and 3,687,282, prior art carriers have been provided with a number of preforated portions or partial severed sections in order to allow the carrier to be torn or ripped apart to remove objects from the carrier. My U.S. Pat. No. 3,747,801 discloses a particular wrap-around carrier with a top portion which can be torn open to thus convert the wrap-around carrier into a basket carrier.

SUMMARY OF THE INVENTION

The invention is summarized in that a carrier for a plurality of objects includes a bottom, a pair of side panels attached to respective opposite side edges of the bottom, end means extending between opposites end edges of the side panels at both ends of the carrier, a top having openings for exposing each of the plurality of objects, the top having strips extending between adjacent pairs of openings to retain the objects therein, and each of the strips having tear means formed therein for allowing the strips to be partial torn from the opening to allow removal of the objects.

An object of the invention is to construct a carrier for a plurality of objects wherein the objects are held positively until they are removed and thereafter the objects can be returned to the carrier.

Another object of the invention is to construct a carrier which is stronger and utilizes less paperboard than similar prior art carriers.

It is also an object of the invention to provide a carrier which allows return of the objects and provides for retention of the objects once returned.

An advantage of the invention is that a carrier combines both the economical high speed packaging rate of the wrap around carriers while employing the handy basket features desired by consumers.

Another advantage of the invention is that the removal of a portion of a carrier and the production of litter by removed portions of carriers are eliminated.

Other objects, advantages and features of the invention will be apparent from the following description of the preferred embodiment taken in conjunction with the accompanying drawings.

BRIEF DESCRIPTION OF THE DRAWINGS

FIG. 1 is a top view of a carrier constructed in accordance with the invention.

FIG. 3 is a plan view of a blank for forming a partition portion of the carrier of FIG. 1.

FIG. 4 is a elevation view from the end of the carrier illustrating its assembly in packaging objects.

FIG. 5 is a detail top view of a portion of the carrier of FIG. 1 after assembly.

FIG. 6 is a view similar to FIG. 5 but illustrating removal of a first bottle therefrom.

DESCRIPTION OF THE PREFERRED EMBODIMENT

Figure 2:
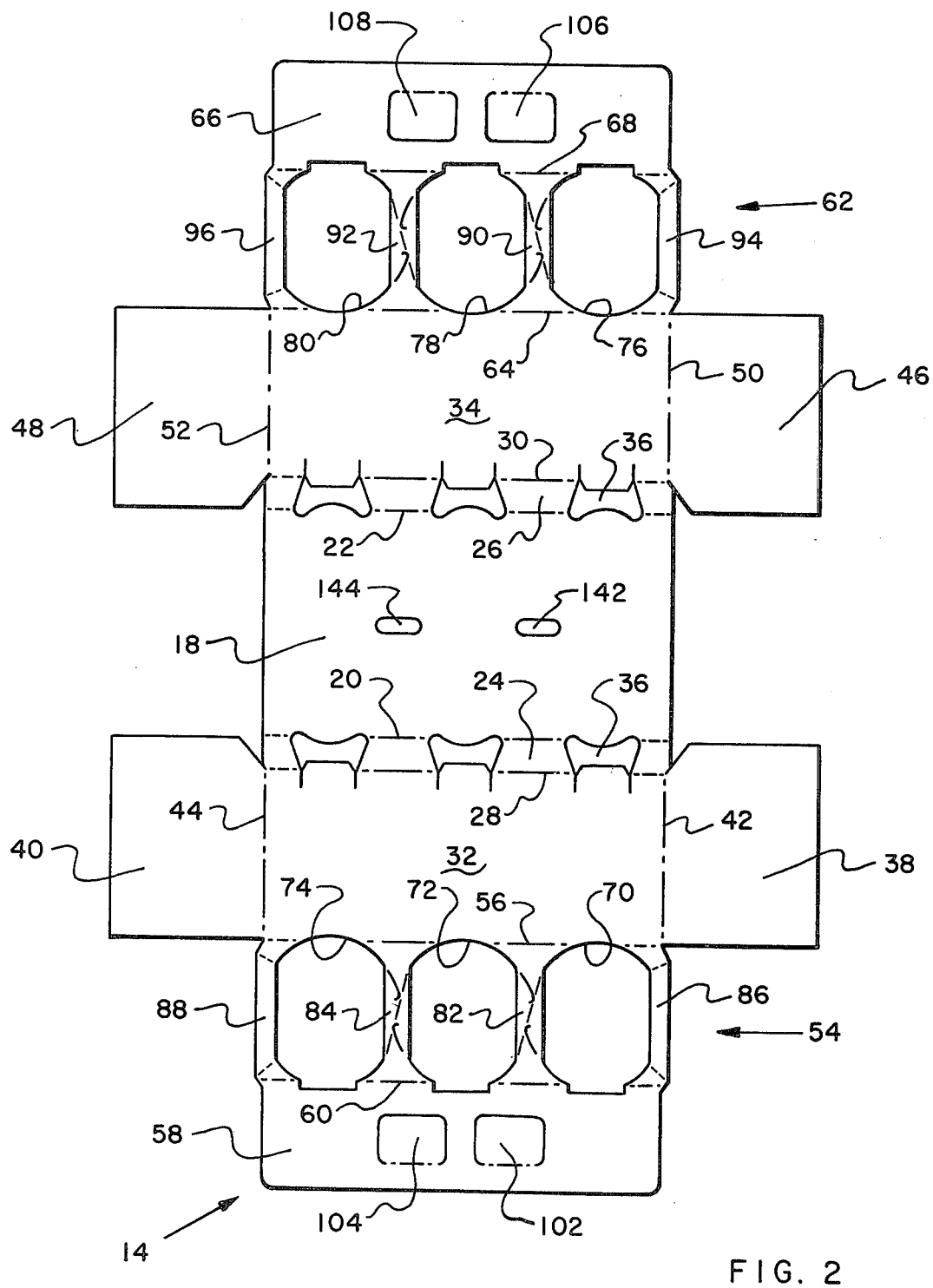
FIG. 2 is a plan view of a blank for forming the wrap-around portion of the carrier of FIG. 1.

As illustrated in FIG. 1 the invention is embodied in a carrier indicated generally at 10 for containing a plurality of objects, such as bottles 12a and 12b shown in FIG. 5. The carrier 10 includes a outer wrap formed from a blank indicated generally at 14 in FIG. 2 and a partition indicated generally at 16 in FIG. 3.

The outer wrap blank 14 includes a bottom or bottom panel 18 which is joined at side edges or score lines 20 and 22 by corner panels 24 and 26 and score lines 28 and 30 to side panels 32 and 34 respectively. The corner panels 24 and 26 have cut outs 36 suitable for receiving a portion of the bottom edge of the bottles. End flaps 38 and 40 are hinged on score lines 42 and 44 to respective end edges of the side panel 32 while end flaps 46 and 48 are hinged at score lines 50 and 52 on respective end edges of the side panel 34. A top panel half, indicated generally at 54, is hinged on the top edge of the side panel 32 at a score line 56, and a handle flap 58 is connected at a score line 60 to the inside edge of the top panel half 54. Similarly a top panel half, indicated generally at 62, is hinged at a score line 64 to the top edge of the side panel 34 while a handle flap 66 is connected at score line 68 to the inside edge of the top panel half 62.

The top panel half 54 has three openings 70, 72 and 74 and the top panel half 62 has three openings 76, 78 and 80, all the openings for exposing or allowing the upper ends or necks of the bottles 12 to extend therethrough. A strip 82 extends between the adjacent pair of openings 70 and 72, a strip 84 extends between the adjacent pair of openings 72 and 74, and edge strips 86 and 88 extend over the outside edges of the openings 70 and 74 on the opposite ends of the top panel half 54. Similarly strips 90 and 92 extend between adjacent pairs of the openings 76–78 and 78–80 while end strips 94 and 96 form outer edge strips for the openings 76 and 80.

The partition 16 shown in FIG. 3, has a pair of die cut finger fold out portions 98 and 100 in the top or handle portion of the partition 16 for cooperating with die cut finger fold out portions 102 and 104, FIG. 2, in the handle flap 58 and with the similar portions 106 and 108 in the handle flap 66. The partition 16 has end tabs 110 and 112 connected at respective score lines 114 and 116 on opposite end edges of the panel 16. Die cuts 118 and 120 form a oppositely extending extensions of the tabs 110 and 112. The central portion of the partition 16 has die cut panels 122, 124, 126 and 128 forming conventional butterfly panels pivotally hinged at score lines 130, 132, 134 and 136. Tabs 138 and 140 are formed on the bottom edge of the partition 16 for extending through openings 142 and 144, FIG. 2, in the bottom panel 18.

Figure 8:
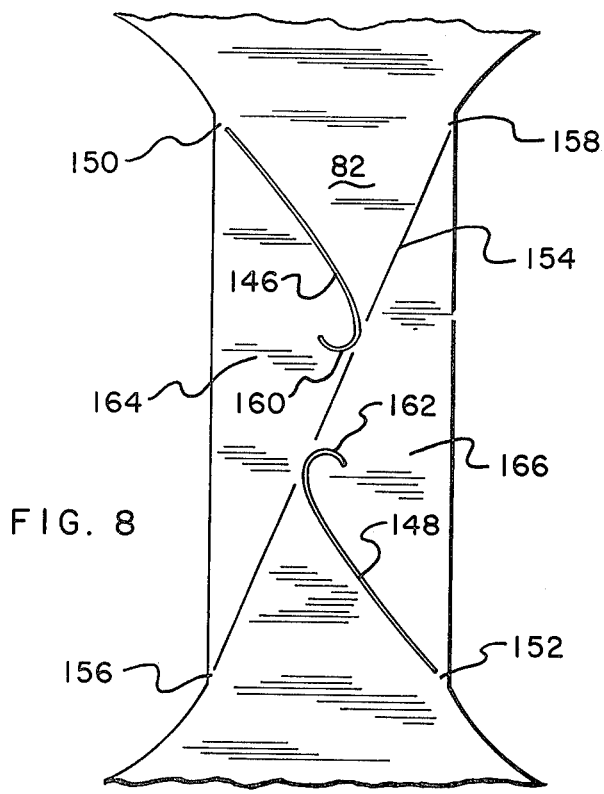
FIG. 8 is a detail view of a strip portion of the carrier blank of FIG. 2.

As shown in FIG. 8 the strip 82 has a generally rectangular configuration with tear means formed therein. The tear means includes a pair of die cuts 146 and 148 extending at an angle inward from respective diagonally opposite corners 150 and 152 of the strip 82. A straight score line 154 extends between the other diagonally opposite corners 156 and 158 of the strip 82. The die cuts 146 and 148 extend from the respective corners 150 and 152 more than half way across the strip 82 to the diagonal score line 154 where curved inner ends 160 and 162 of the die cuts 146 and 148 are curled back from the diagonal 154 toward the edges of the strip 82 where the cuts 146 and 148 originate respectively. The die cuts 146 and 148 are confined substantially within opposite triangular end portions formed by the ends of the strip 82 and the diagonals of the strip 82 such that the die cuts are spaced from a vertex formed by the diagonals. The die cuts 146 and 148 extend very close to the respective corners 150 and 152, for example about 1.6 millimeters (1/16 of an inch) or less, such that the corner portions 150 and 152 may be readily torn by lifting an object from the respective opening 70 or 72. The curled ends 160 and 162 of the die cuts 146 and 148 are spaced from each other and from the edges of the strip 82 by at least about 4 millimeters (5/32 of an inch) such as to maintain a relatively non-tearable continuous portion of the strip 82. It is noted that the die cuts 146 and 148 extend from the respective corners 150 and 152 at an acute angle with respect to the adjoining edges of the strip 82 such as to produce as small a length of diagonal score line 154 between the die cut 146 and the corner 156 and between the die cut 148 and the corner 158 as possible without producing any substantial reduction in the minimum amount of spacing required between the die cuts 146 and 148. The die cut 146, the section of the diagonal score 154 between the end 160 and the corner 156, and the edge of the strip 82 between the corners 150 and 156 form a generally triangular flap portion 164 hinged upon an axis about the score line 154; and the die cut 148, the section of the score line 154 between the end 162 and the corner 158, and the side edge between the corners 152 and 158 form a generally triangle flap portion 166 hinged about the axis 154.

The strips 84, 90 and 92 have tear means similar to the strip 82. The tear means and the flap portions defined thereby have sizes, such as lengths, widths, etc., sufficient such that, when the tear means are torn and the flap portions are bend upward, the respective openings 70, 72, 74, 76, 78 and 80 are enlarged enough to allow removal of the bottles through the openings.

As shown in FIGS. 1, and 5, the end strap 86 has score lines 168 and 170 at opposite ends thereof where the strap 86 is secured to the rest of the top panel half 54. The score lines 168 and 170 are formed at opposite angles outwardly to produce a trapezoidal shaped strip 86 which has its narrow parallel side contigous the opening 70 and its long parallel side at the end of the carrier. Similar to the score lines 168 and 170, score lines are formed in the other end strips 88, 94 and 96.

The outside wrap 14 and the partition 16 can be made from any material suitable for forming basket or wrap around carriers; for example the outside wrap 14 and the partition 16 can be paper board or the like. Material of this type is generally resilient, i.e. when bent the material tends to return from the bent position back to the unbent position when the material is released.

In packaging a group of six bottles in the carrier 10, as illustrated in FIG. 4, the divider or partition 16 is first inserted with the butterfly flaps 122, 124, 126 and 128 suitably positioned between the individual bottles of the group of six bottles which are then positioned on top of the bottom panel 18 of the outer wrap 14. The side panels 32 and 34 are bent upward into engagement with the outsides of the bottles. The top panels halves 54 and 62 are folded inwardly over the tops of the bottles so that the tops or necks of the bottles stick upwardly through the respective openings 70, 72, 74, 76, 78 and 80. The handle flaps 58 and 66 are secured to the upper handle portion of the partition 16 by suitable means such as glue, staples or the like. The end tabs 110 and 112 are bent perpendicular to the central portion of the partition 16, and the end flaps 38, 40, 46 and 48 are bent inward and suitably secured together and to the end tabs 110 and 112 to extend across the ends of the carrier 10. The tabs 138 and 140 are bent over and suitably secured to the bottom of the bottom panel 18. The aligned finger openings 102-100-106 and 104-98-108 maybe utilized in a conventional manner to provide carrying finger holes and strengthening of the handle portion of the carrier.

Figure 9:
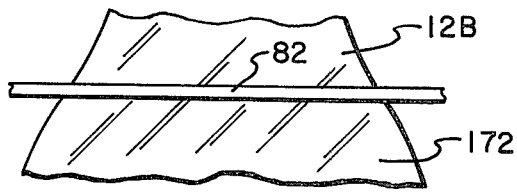
FIG. 9 is a detailed elevational cross section view of a strip and a broken way object retained by the strip of the carrier of FIG. 5.

As illustrated in FIGS. 5 and 9, the strips 82, 84, and 86 engage shoulder portions 172 of the bottles to securely hold the bottles within the carrier 10.

Figure 10:
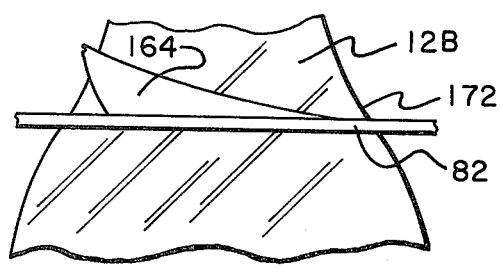
FIG. 10 is a view similar to FIG. 9 but illustrating the removal of the removal of an object.

When it is desired to remove the bottle 12b from the opening 72, the upward projecting top of the bottle 12b is gripped and pulled upward while the rest of the carrier 10 is held down. The shoulder portion 172 engaging the strip 82 tears the corner 150 causing the triangular flap 164 to pivot upward, as shown in FIGS. 6 and 10, about the hinge line 154. Similarly a corner portion and flap on the strip 84 will be torn and pivoted upward about its diagonal score line. Thus, the bottle 12b exposed in the opening 72 can be removed from the carrier 10.

Figure 7:
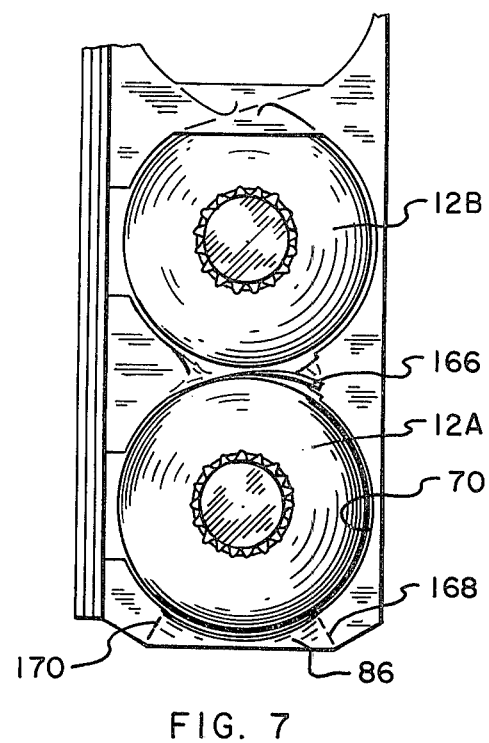
FIG. 7 is a view similar to FIG. 5 but illustrating removal of a second bottle therefrom.

When it is desired to remove the bottle 12a in the opening 70, the upward movement of the bottle 12a causes the tearing of the corner 152 and pivoting of the triangular flap 166 about the score line 154 as illustrated in FIG. 7. The end strip 86 is twisted at its center into a substantially vertical alignment, the twist extending back to the respective score lines 168 and 170. The twisting of the center portion of the strap 86 allows the strip 86 to deform outwardly permitting the bottle 12a to pass through the opening 70 without tearing the strip 86.

Figure 11:
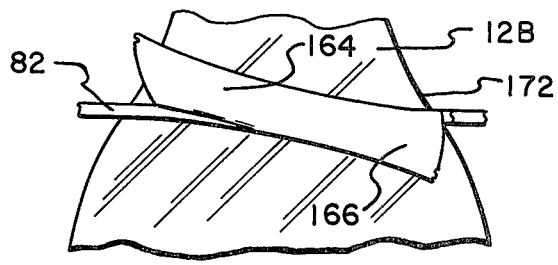
FIG. 11 is a view similar to FIGS. 9 and 10 but illustrating an alternate mode of operation of the carrier in removing an object.

As illustrated in FIG. 11 when the bottle 12a is first removed from the opening 70 and then the bottle 12b is removed through the opening 72 the lifting of the bottle 12b and the pivoting of the triangular flap 164 upward also tends to rotate the previously torn triangular flap 166 downward.

It is partically adventageous that the carrier 10 has strips 82, 84, 90 and 92 with tear means between adjacent pairs of openings in the carrier 10 for holding the objects in carrier. This particular constuction allows the bottles to be packaged and shipped similar to wrap around carriers but allows the carrier to be used as a basket carrier enabling easy removal and return of bottles. The small tear corners 150 and 152 formed by the die cuts 146 and 148 in the strap 82 are easily torn allowing the bottles in openings 70 and 72 to be easily removed and then returned to the carrier. The shape of the triangular flaps 164 and 166 are such that the openings are enlarged when the flaps 164 and 166 are pivoted up sufficient to allow the bottles to pass through the openings 70 and 72. Additionally the resilient nature of the flaps 164 and 166 tend to hold the bottles in the carrier when returned.

The curled ends 160 and 162 (FIG. 8) of the die cuts 146 and 148 produce rounded corners at their intersection with the score line 154 to substantially inhibit tearing of the strip 82 past the die cut 146 and 148. The rounded corners tend to distribute forces over a larger area as opposed to a non-curved end on a cut which would concentrate the forces at the end of the cut.

Having the die cuts 146 and 148 extended from the corners 150 and 152 toward the center portion of the strip 82 results in a stronger and more durable strip 82 since the end portions of the strip 82 remain attached across their entire width to the rest of the top panel half 54. The strip 82 is weakened most at its center portion where the greatest width of opening is required due to the round bottles. The triangular shaped flap 164 with the edge of the strip 82 forming one side, the die cut 146 forming a second side, and a portion of the diagonal score line 154 forming the third side, is simple to form, and opens to a shape closely related to the opening necessary to pass the round bottles. It is noted that the portion of the diagonal 154 between the end 160 of the die cut 146 and the corner 156 is substantially shorter than the length between corners 150 and 156, thus producing a hinge which is easily bent without buckling or bending in a portion of the strip 82 outside of the line 154.

Since many modifications, variations, and changes in detail may be made to the presently described embodiments, it is intended that all matter in the foregoing description and in the accompanying drawings be interrupted as illustrative and not in a limiting sense.

What is claimed is:

1. A carrier for a plurality of objects wherein the objects are to be removed from the top of the carrier, the carrier comprising
a bottom,
a pair of side panels attached to respective opposite side edges of the bottom,
end means extending between opposite end edges of the side panels at both ends of the carrier,
a top having respective openings for exposing each of the plurality of objects,
said top having strips extending between adjacent pairs of the openings to retain the objects therein,
each of said strips having tear means formed therein for allowing each strip to be partially torn from an edge of a respective one of the openings, and
said tear means having a size sufficient to enlarge the respective openings enough when torn to allow removal of the objects through the respective openings.

2. A carrier as claimed in claim 1 wherein the tear means only extends partially across each strip for allowing each strip to be easily torn only partially thereacross.

3. A carrier as claimed in claim 1 wherein the tear means includes a die cut extending transverse in each of the strips.

4. A carrier as claimed in claim 3 wherein a portion of each strip between one end of the die cut and the respective one of the openings is sufficiently narrow to allow easy tearing of the portions by lifting of the objects through the respective openings.

5. A carrier as claimed in claim 4 wherein the other end of each die cut is curled back toward the respective one of the openings to prevent further tearing of the strip at the other end of the die cut.

6. A carrier as claimed in claim 4 wherein each strip has a score line for forming a hinge for a flap defined by the edge of the respective one of the openings, the die cut, and the torn portion of the strip.

7. A carrier for a plurality of objects comprising
a bottom,
a pair of side panels attached to respective opposite side edges of the bottom,
end means extending between opposite end edges of the side panels at both ends of the carrier,
a top having openings for exposing each of the plurality of objects,
said top having strips extending between adjacent pairs of the openings to retain the objects therein, and
each of said strips having a die cut extending transverse in each of the strips for allowing the strips to be partially torn from the edges of the openings to allow removal of the objects,
a portion of each strip between one end of the die cut and a respective one of the openings being sufficiently narrow to allow easy tearing of the portion by lifting of the objects through the openings,
each strip having a score line and a flap which is bounded by the edge of the respective one of the openings, the score line, the die cut, and the torn portion of the strip, and
said score line forming a hinge for the flap and being formed along a diagonal of the strip.

8. A carrier as claimed in claim 7 wherein the score line extends between an end of the die cut and a corner of the strip, and the score line has a length substantially less than the length of an edge of the strip forming one edge of the flap.

9. A carrier for a plurality of objects wherein the objects are to be removed from the top of the carrier, the carrier comprising
a bottom,
a pair of side panels attached to respective opposite side edges of the bottom, end means extending between opposite end edges of the side panels at both ends of the carrier, a top having a plurality of openings each for exposing a respective one of the plurality of objects, said top having strips extending between adjacent pairs of the plurality of openings to retain the objects therein, a plurality of flaps including a flap formed in each of said strips and bordering a respective one of the openings, said flaps having a size sufficient to enlarge the respective openings enough when bent upward to allow removal of the objects through the respective openings, and the number of said flaps being at least equal to the number of openings.

10. A carrier for a plurality of objects comprising a bottom, a pair of side panels attached to respective opposite side edges of the bottom, end means extending between opposite end edges of the side panels at both ends of the carrier, a top having a plurality of openings each for exposing a respective one of the plurality of objects, said top having strips extending between adjacent pairs of the plurality of openings to retain the objects therein, each of said strips having a flap formed therein adjacent each respective opening such that each flap may be bent upward to allow removal of the objects from the openings, each flap being hinged on a score line extending along a diagonal of each strip, and each flap being defined by a die cut extending from a corner of the strip to the diagonal, the score line, and an edge of each respective opening.

11. A carrier as claimed in claim 10 wherein the top has end strips extending between openings adjacent ends of the carrier and the ends of the carrier, and wherein there is formed a pair of score lines on opposite ends of each end strip to allow easy bending and twisting of each end strip by removal of an object.

12. A wrap-basket carrier for six bottles comprising a paper board partition having butterfly panels for extending between the six bottles to prevent engagement between the bottles, said partition also having a handle portion with finger openings; and an integral paper board wrap having a bottom panel, a pair of corner panels hinged on respective opposite side edges of the bottom panel, a pair of side panels hinged on the respective pair of corner panels, a pair of end flaps hinged on respective end edges of each of the pair of side panels, a pair of top panel halves hinged on respective top edges of the pair of side panels, and a pair of handle panels hinged on the inside edge of the pair of top panel halves;

said top panel halves are having three openings for receiving the top portion of three bottles, trapezoidal strips at the end edges defining one side of the openings adjacent the ends, and a pair of rectangular strips extending between the openings;

said trapezoidal strips having score lines forming the non-parallel sides thereof; and each of said rectangular strips having a score line extending along a diagonal between one pair of diagonally opposed corners, a pair of die cuts extending from respective points about 1.6 millimeters from each of the other pair of diagonally opposed corners at an angle across the rectangular straps to the score line, the inward extending end of the die cuts curling back toward the edge of the strap from the score line, and said curled ends of the die cuts being spaced by more than about 4 millimeters from the edges of the rectangular strip and each other.

* * * * *

UNITED STATES PATENT AND TRADEMARK OFFICE
CERTIFICATE OF CORRECTION

PATENT NO. : 3,949,870
DATED : April 13, 1976
INVENTOR(S) : Earl J. Graser

It is certified that error appears in the above–identified patent and that said Letters Patent are hereby corrected as shown below:

```
Column 1 line 25 change "up" to --by--;
         line 37 change "preforated" to --perforated--.
Column 4 line 8 after "Fig. 1" delete the comma ",";
         line 13 change "contigous" to --contiguous--.
Column 5 line 2 change "strap" to --strip--;
         line 12 change "partically adventageous" to
                  --particularly advantageous--;
         line 20 change "strap" to --strip--;
         line 58 change "interrupted" to --interpreted--.
Column 6 lines 48 and 49 change "suffiently" to
                  --sufficiently--.
Column 8 line 19 change "are" to --each--.
```

Signed and Sealed this

Second Day of November 1976

[SEAL]

Attest:

RUTH C. MASON
Attesting Officer

C. MARSHALL DANN
Commissioner of Patents and Trademarks